(12) United States Patent
Carraro

(10) Patent No.: US 11,316,417 B2
(45) Date of Patent: Apr. 26, 2022

(54) ROTOR OF A CLAW POLE MACHINE

(71) Applicant: SEG Automotive Germany GmbH, Stuttgart (DE)

(72) Inventor: Enrico Carraro, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 822 days.

(21) Appl. No.: 16/170,791

(22) Filed: Oct. 25, 2018

(65) Prior Publication Data

US 2019/0123602 A1 Apr. 25, 2019

(30) Foreign Application Priority Data

Oct. 25, 2017 (DE) ..................... 10 2017 219 062.0

(51) Int. Cl.
*H02K 21/04* (2006.01)
*H02K 21/12* (2006.01)
*H02K 21/14* (2006.01)
*H02K 1/27* (2022.01)
*H02K 1/24* (2006.01)
(Continued)

(52) U.S. Cl.
CPC ................................. *H02K 21/044* (2013.01)

(58) Field of Classification Search
CPC ........ H02K 1/27; H02K 1/2706; H02K 1/272;
H02K 1/2726; H02K 1/274; H02K
1/2753; H02K 1/276; H02K 1/2766;
H02K 1/243; H02K 1/24; H02K 1/223;
H02K 1/22; H02K 1/2713; H02K 21/044;
H02K 21/046; H02K 21/048; H02K
21/042; H02K 21/04; H02K 21/00; H02K
21/02; H02K 21/12; H02K 21/14
See application file for complete search history.

(56) References Cited

U.S. PATENT DOCUMENTS 5,132,581 A * 7/1992 Kusase .................. H02K 1/243
310/181
5,483,116 A * 1/1996 Kusase ................ H02K 21/044
310/156.66
(Continued)

FOREIGN PATENT DOCUMENTS

CN 105745818 A 7/2016
CN 106357024 A 1/2017
(Continued)

OTHER PUBLICATIONS

German Patent Application No. DE 10 2017 219 062.0, extract from Search Report dated May 14, 2018. 1 pg.
(Continued)

*Primary Examiner* — Edgardo San Martin
(74) *Attorney, Agent, or Firm* — Lathrop GPM LLP

(57) ABSTRACT

A Rotor of a claw pole machine (12), having a rotor winding (5), which is surrounded by pole fingers of claw poles, for generating an excitation field, and having permanent magnets (8, 10), wherein two permanent magnets (8), which are arranged offset in the circumferential direction and have a magnetization in the circumferential direction, are allocated to a pole finger (3) in the axial direction next to the pole finger, a magnetic flux guiding element (9) being arranged between the two permanent magnets (8).

18 Claims, 6 Drawing Sheets

(51) Int. Cl.
*H02K 21/00* (2006.01)
*H02K 1/22* (2006.01)

(56) References Cited

U.S. PATENT DOCUMENTS

| | | | | |
|---|---|---|---|---|
| 5,578,885 | A * | 11/1996 | Alford | H02K 1/243 310/181 |
| 5,892,313 | A * | 4/1999 | Harris | H02K 21/044 310/263 |
| 6,037,695 | A * | 3/2000 | Kanazawa | H02K 21/044 310/263 |
| 6,455,978 | B1 * | 9/2002 | Krefta | H02K 21/044 310/156.66 |
| 6,538,358 | B1 * | 3/2003 | Krefta | H02K 21/044 310/263 |
| 7,656,069 | B2 * | 2/2010 | Shinkawa | H02K 21/044 310/263 |
| 7,919,900 | B2 * | 4/2011 | Kusase | H02K 21/044 310/263 |
| 8,933,610 | B2 * | 1/2015 | Yamada | H02K 16/02 310/263 |
| 9,577,501 | B2 * | 2/2017 | Bradfield | H02K 3/528 |
| 10,461,614 | B2 * | 10/2019 | Dajaku | H02K 1/2713 |
| 10,790,734 | B2 * | 9/2020 | Takahashi | H02K 21/044 |
| 2004/0119357 | A1 | 6/2004 | Gamm et al. | |
| 2009/0218907 | A1 | 9/2009 | Kusase | |
| 2017/0019004 | A1 | 1/2017 | Dajaku | |
| 2021/0143715 | A1 * | 5/2021 | Dajaku | H02K 21/044 |

FOREIGN PATENT DOCUMENTS

| | | | |
|---|---|---|---|
| DE | 102013012569 A1 | 2/2014 | |
| DE | 102012217221 A1 * | 3/2014 | H02K 21/048 |
| DE | 102014104199 A1 * | 10/2014 | H02K 21/044 |
| DE | 102015111480 A1 | 1/2017 | |
| EP | 0723330 A2 * | 7/1996 | H02K 21/044 |
| EP | 0837538 A1 * | 4/1998 | H02K 21/044 |
| JP | H08223882 A * | 8/1996 | |
| JP | 2009124862 A * | 6/2009 | |
| JP | WO2009028228 A1 * | 11/2010 | H02K 21/044 |
| JP | 2015510389 A * | 4/2015 | |
| JP | 2015095940 A * | 5/2015 | |
| JP | 2015220906 A * | 12/2015 | |
| JP | 2016127648 A | 7/2016 | |
| WO | WO 2009072316 A1 | 6/2009 | |

OTHER PUBLICATIONS

Chinese Patent Application No. 201811236526.4, Office Action dated Feb. 8, 2022 with English translation, 16 pages.

* cited by examiner

ROTOR OF A CLAW POLE MACHINE

CROSS-REFERENCE TO RELATED APPLICATION

This application claims priority to German Patent Application No. 10 2017 219 062.0, filed Oct. 25, 2017, which is incorporated herein by reference.

SUMMARY

The invention relates to a rotor of a claw pole machine with permanent magnets on both axial end faces of the rotor.

BACKGROUND

DE 10 2015 111 480 A1 describes a rotor of a claw pole machine, wherein the rotor comprises a main rotor, which has claw poles in a known manner, as well as an auxiliary rotor at each of the axial end faces, wherein the auxiliary rotors are connected to the main rotor in a rotationally fixed manner and each carry permanent magnets distributed in the circumferential direction to improve the magnetic flux. The permanent magnets are embodied as flat magnets and have an axial north-south magnetization relative to the rotor axis. The auxiliary rotor, to which the permanent magnets are attached, is embodied as a carrier ring made of ferromagnetic material.

DISCLOSURE OF THE INVENTION

The rotor according to the invention is used in claw pole machines, which can be used for example as a generator or motor or starter generator in vehicles, especially motor vehicles. The rotor is provided with a rotor winding surrounded by pole fingers of claw poles, which winding forms an excitation winding and when energized, a magnetic excitation field is generated which interacts with magnetic fields in stator windings. To improve and influence the magnetic flux in the rotor, there are permanent magnets in the axial direction (relative to the axis of rotation) of the rotor next to the pole fingers. At least one, preferably several, in particular all pole fingers in the rotor are associated with permanent magnets in the axial direction next to the pole fingers, or at one or both axial end faces of the rotor, respectively. The magnets have a north-south magnetization in circumferential direction of the rotor.

Exactly two permanent magnets are allocated to a pole finger in the axial direction next to the pole finger, or at an axial end face of the rotor, respectively, which magnets are offset from each other in the circumferential direction and lie in particular at the tip of the pole finger; the two permanent magnets form a pair of magnets. The magnetization of the two permanent magnets is chosen so that the same poles of the permanent magnets face each other. Between the permanent magnets, which are associated with a pole finger, there is preferably a—in particular non-permanent magnetic—magnetic flux guiding element (e.g. comprising iron and/or cobalt and/or nickel), which guides the magnetic flux, which emanates from the permanent magnets and the excitation winding in the rotor.

The magnetic flux guiding element can extend directly to the permanent magnets and be in contact with the permanent magnets. In an alternative embodiment it is also possible that there is a gap between the permanent magnets and the magnetic flux guiding element.

The same poles of the permanent magnets facing each other of a pair of magnets and the intermediate magnetic flux guiding element cause a magnetic flux concentration, which increases the efficiency and the torque generated in the claw pole machine. This also makes it possible to use low remanence flux densities and inexpensive permanent magnets (e.g. ferrite magnets).

Accordingly, it is advantageous if the same poles of the permanent magnets facing each other of a pair of magnets have the same polarity as the associated claw pole finger during operation of the electric machine.

It is also advantageous that the rotor-side permanent magnets can be positioned at a greater distance from the stator field, which reduces the thermal load on the permanent magnets and reduces the risk of demagnetisation. The magnetic field generated by the rotor-side excitation winding is influenced and partially amplified by the magnetic field between the permanent magnets.

In accordance with an advantageous embodiment, to each individual pole finger two permanent magnets with an intermediate—in particular non-permanent magnetic—magnetic flux guiding element are allocated. Advantageously, the two permanent magnets of a pair of magnets and the intermediate magnetic flux guiding element are located adjacent to the tip of a pole finger, especially in a symmetrical manner, so that the tip of the pole finger points to the center of the intermediate magnetic flux guiding element.

According to another advantageous embodiment, permanent magnets with intermediate—especially non-permanent magnetic—magnetic flux guiding elements are arranged adjacent to the respective tips of the pole fingers at both opposite ends of the rotor. It is particularly advantageous that two permanent magnets with an intermediate magnetic flux guiding element are allocated to each individual pole finger on each axial end face.

In particular, the rotor has twice as many permanent magnets on each axial end face as pole finger tips, i.e. a separate pair for each pole fingertip.

At an axial end face, between the pair of permanent magnets allocated to one pole finger and the next pair of permanent magnets allocated to the following pole finger, a further—in particular non-permanent magnetic—magnetic flux guiding element can be arranged. The permanent magnets of the neighbouring pole fingers on the same axial end face of the rotor have the same magnetization on their sides facing each other. This area, which is bridged by another magnetic flux guiding element, is allocated to a pole root, i.e. the connecting section between the pole wheel disc and a pole finger on the side axially opposite the tip of the pole finger. With the additional magnetic flux guiding elements between the permanent magnets of adjacent pairs of magnets, in the circumferential direction a ring-shaped continuous series of permanent magnets and magnetic flux guiding elements in alternating order is achieved. It is advantageous that all magnetic flux guiding elements are adjacent to the side surfaces facing each other of the permanent magnets.

In a preferred embodiment, pairs of permanent magnets with an intermediate—in particular non-permanent magnetic—magnetic flux guiding element are arranged on both axial end faces of the rotor adjacent to each tip of a pole finger. In addition, as described above, other magnetic flux guiding elements are located between the pairs of magnets of neighbouring pole fingers.

According to another advantageous embodiment, the permanent magnets are axially neighboured by a cavity, which is inserted into the pole wheel disc, which is the carrier of the pole fingers. The cavity forms a resistance for the magnetic flux and thus serves to direct the magnetic flux in the area adjacent to the permanent magnets. The cavity is neighboured in particular to the radially inner side of the permanent magnets and extends along the radially inner side over the axial length of the permanent magnets.

The permanent magnets are located at the axial end faces of the rotor. The permanent magnets can be arranged directly on the rotor and connected to it, especially integrated into the pole wheel discs, which support the pole fingers. In an alternative embodiment, the permanent magnets and the intermediate magnetic flux elements are arranged on a separately formed additional rotor ring which is connected to the rotor in a rotationally fixed manner. This embodiment with the additional rotor ring has the advantage that there are greater design possibilities with regard to the arrangement of the permanent magnets and the magnetic flux guiding elements.

Advantageously, the additional rotor ring consists of a non-ferromagnetic material, so that the magnetic field remains unaffected by the additional rotor ring. In a preferred embodiment, there is an additional rotor ring on each axial end face of the rotor, which additional rotor ring supports the permanent magnets and the magnetic flux guiding elements. The additional rotor ring sits in particular on a rotor shaft of the rotor.

The magnetic flux guiding elements preferably consist of iron or contain at least iron.

The permanent magnets can be essentially or exactly cuboid.

Further advantages and practical embodiments can be found in the claims, the description of the figures and the drawings.

DETAILED DESCRIPTION OF THE FIGURES

In the figures the same elements are provided with the same reference signs.

Figure 1:
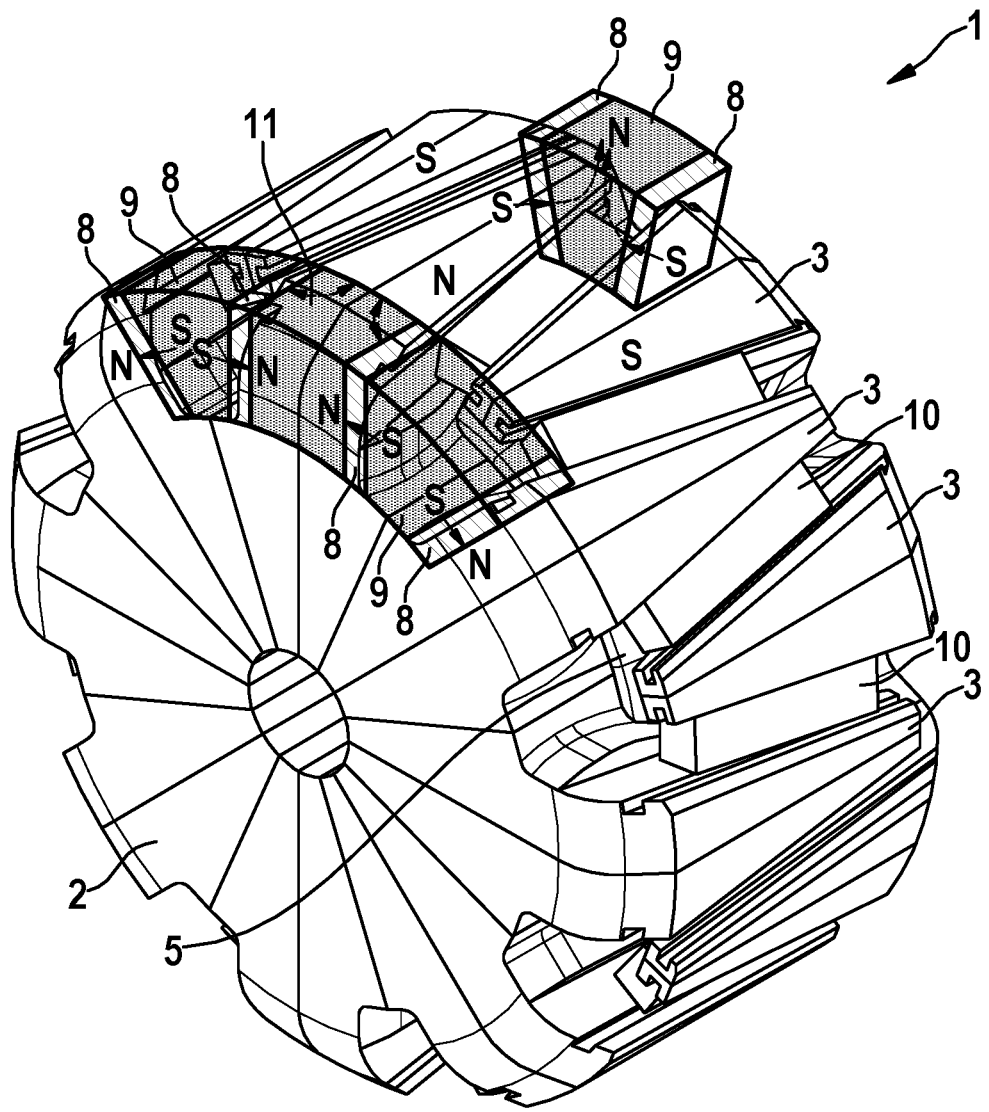
FIG. 1 shows in perspective view, a rotor of a claw pole machine with permanent magnets arranged on one axial end face with intermediate magnetic flux guiding elements.
Figure 2:
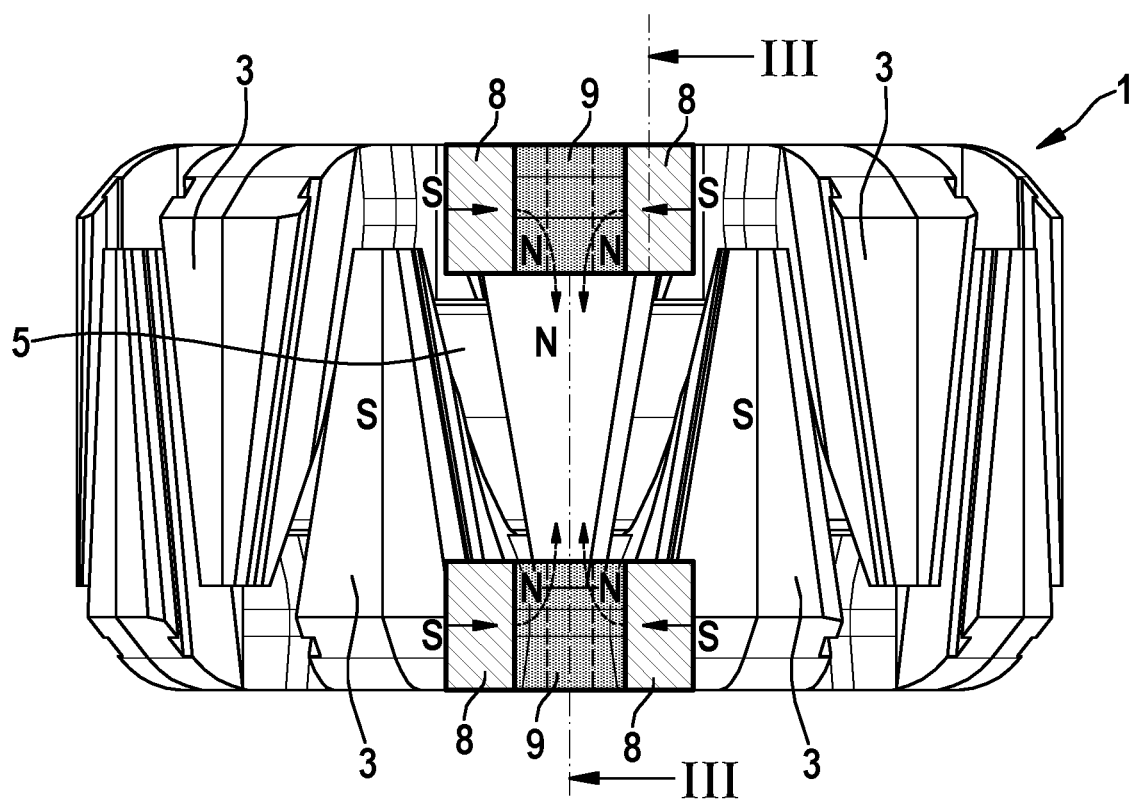
FIG. 2 shows a side view of the rotor.

FIGS. 1 and 2 show a rotor 1 of a claw pole machine, which comprises two pole wheel halves, each having a pole wheel disc 2 on the axial end face and axial pole fingers 3, the pole fingers 3 of the different pole wheel halves engaging one another and alternating in the circumferential direction with different polarization. The magnetization is generated by a rotor winding 5 to generate an excitation field.

Figure 3:
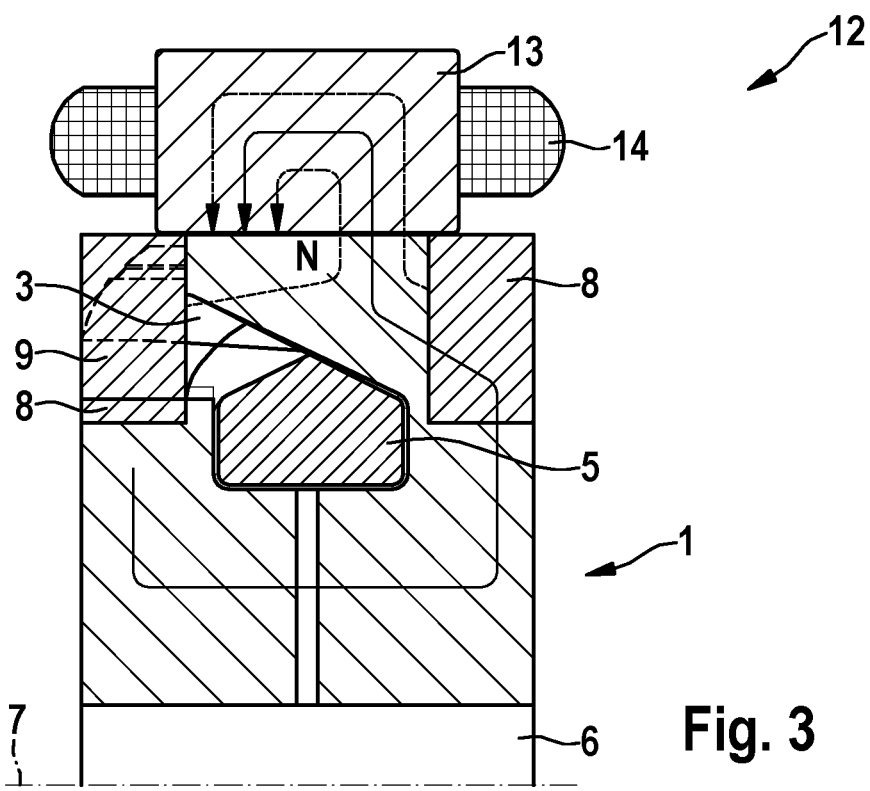
FIG. 3 shows a sectional view along section line III-III of FIG. 2, with additionally shown magnetic flux lines.
Figure 4:
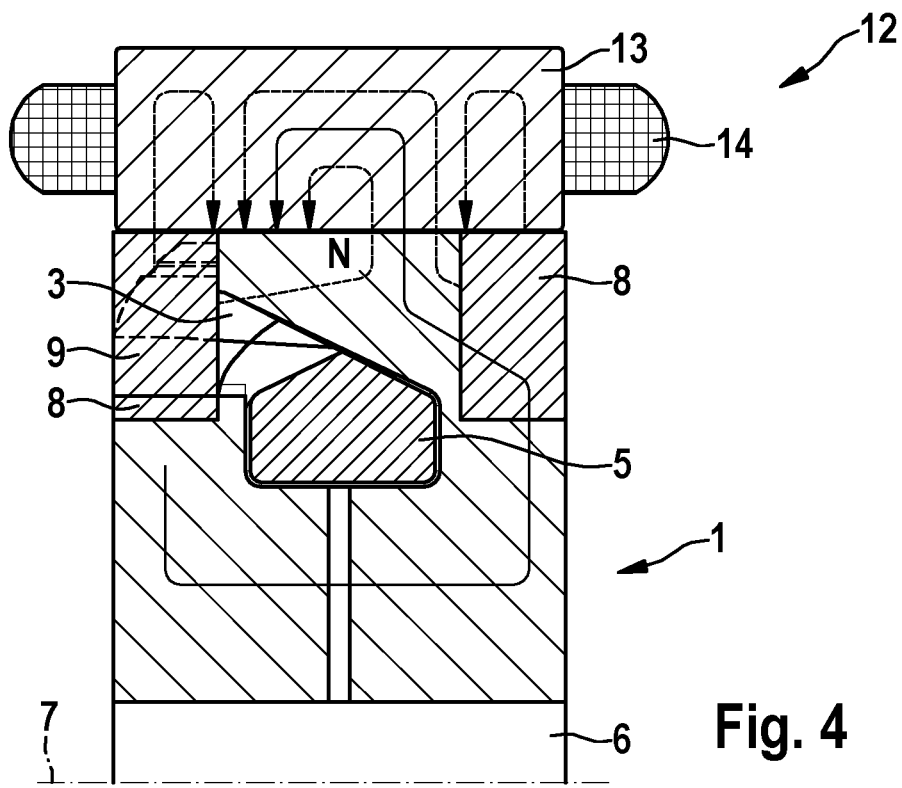
FIG. 4 shows a sectional view corresponding to FIG. 3, but with an axially extended stator.
Figure 7:
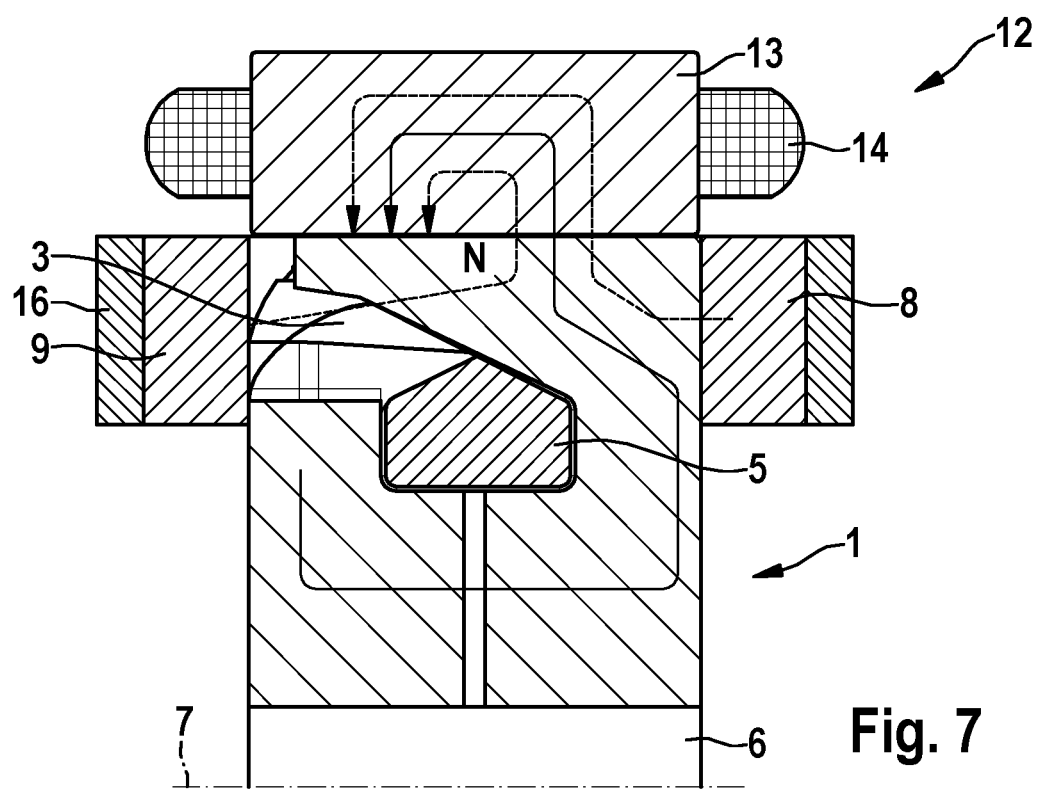
FIG. 7 shows a sectional view through a claw pole machine with a rotor according to FIG. 6.

In the figures the north pole N and the south pole S are shown in alternating order of the pole fingers 3. The pole fingers 3 enclose the excitation or rotor winding 5 which is wound in rotor 1 on a pole core which rests on a rotor shaft 6 (FIGS. 3, 4, 7). The rotor axis is marked with the reference sign 7.

On the two axially opposite end faces of rotor 1 next to the pole fingers in the axial direction there are permanent magnets 8 which are shifted relative to each other in the circumferential direction. A magnetic flux guiding element 9 is arranged between the permanent magnets. Each two permanent magnets 8 form a pair of magnets which is arranged axially in front of the tip of a pole finger 3. Each pair of magnets with the permanent magnets 8 and the intermediate magnetic flux guiding element 9 is arranged in radial direction and in circumferential direction in such a way that the tip of one pole finger 3 points centrally to a magnetic flux guiding element 9 between two allocated permanent magnets 8. The magnetization of the permanent magnets of a pair of magnets is aligned in such a way that identical poles of the permanent magnets face each other and these poles correspond to the polarity of the allocated pole finger 3. For example, a pair of magnets whose permanent magnets have the polarity S (south pole) on the side facing the intermediate magnetic flux guiding element 9 lies in front of the tip of an S pole finger.

Between immediately adjacent pole fingers 3, which belong to different pole wheel halves, there are additional permanent magnets 10 in the embodiment of the rotor according to FIG. 1, which additionally amplify the magnetic field. The additional permanent magnets 10 are located between the side faces of adjacent pole fingers 3. In the example of rotor 1 as shown in FIG. 2, such permanent magnets are not used between immediately adjacent pole fingers 3.

Further magnetic flux guiding elements 11 are located between each two pairs of magnets on the back of a pole finger 3 in the area of the so-called pole root, which represents the transition from the pole wheel disc 2 to the pole fingers 3. Both the magnetic flux guiding elements 9, which are allocated to a pair of magnets and are arranged between the two permanent magnets 8 of the pair of magnets, and the other magnetic flux guiding elements 11 between adjacent pairs of magnets serve to guide the magnetic flux, which emanates from the permanent magnets and the current-carrying windings and is directed in the direction of the pole fingers 3.

FIG. 3 shows a claw pole machine 12 with a rotor 1, which is shown along the section line III-III from FIG. 2, and with a surrounding stator 13 with a stator winding 14. In FIG. 3 the magnetic flux lines are drawn, which are decisively influenced by the permanent magnets 8 and the magnetic flux guiding elements 9 and 11.

FIG. 4 essentially corresponds to the embodiment in FIG. 3, but stator 13 in FIG. 4 has a greater axial length, which has an effect on the magnetic field. As can be seen from a comparison between FIG. 3 and FIG. 4, the embodiment of FIG. 4 produces additional magnetic field lines which emanate from the permanent magnets 8 and extend in the direction of the stator windings 14.

Figure 5:
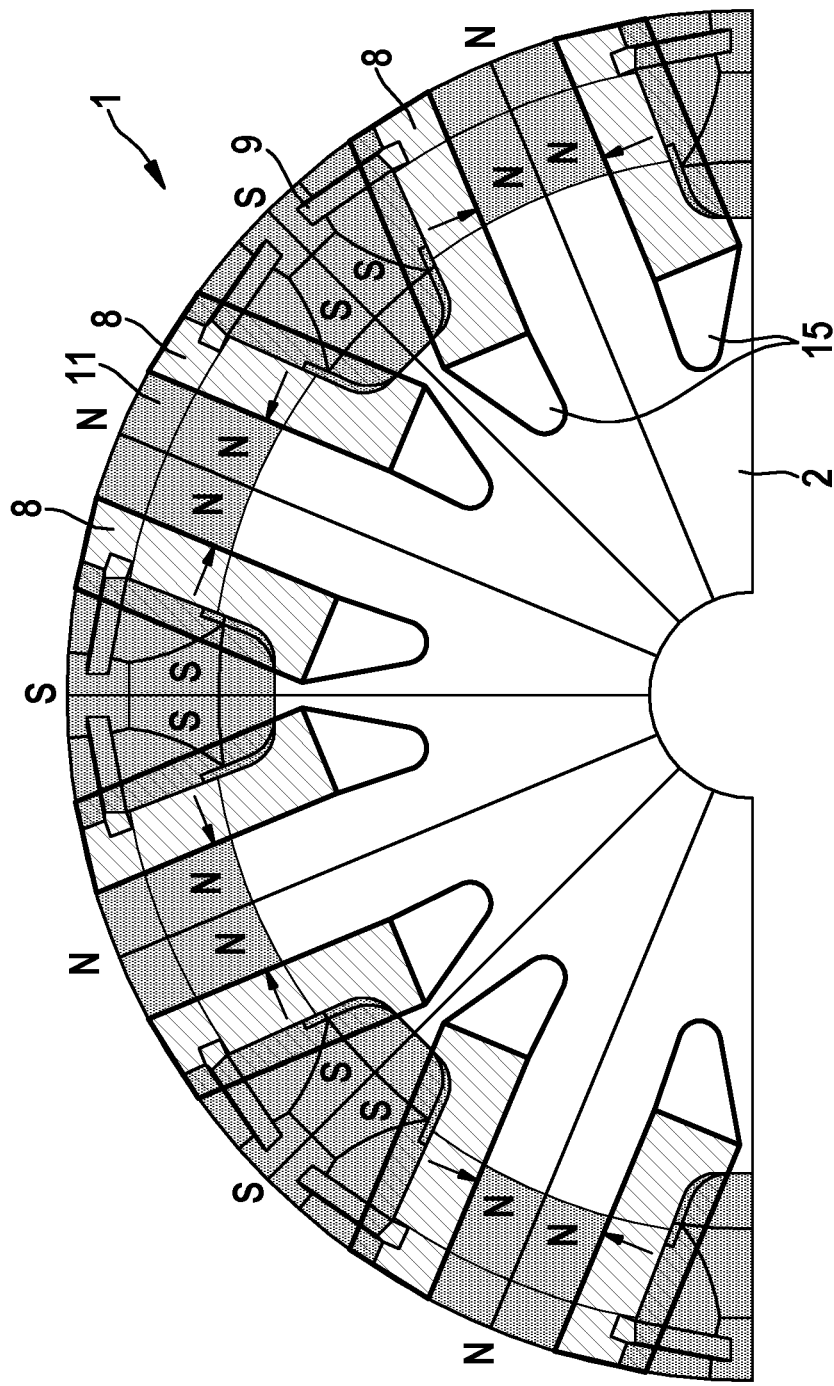
FIG. 5 shows a view of a rotor with a structure as shown in FIGS. 1 and 2, but with additional cavities in a polar wheel disc adjacent to the inner face of the permanent magnets.

FIG. 5 shows a further example with a rotor 1, which has pairs of magnets with permanent magnets 8 distributed over the circumference, wherein magnetic flux guiding elements 9 are arranged between them in the circumferential direction. Further magnetic flux guiding elements 11 are arranged between the permanent magnets of 8 adjacent pairs of magnets.

On the radially inner side of the permanent magnets 8, which are accommodated and fastened in the pole wheel disc 2, there is a cavity 15, which is inserted into the pole wheel disc 2. The cavities 15 can extend in axial direction over the length of the permanent magnets 8. The cavities 15 have the function of a magnetic flux resistor and influence the propagation of the magnetic field accordingly. By means of the cavities 15, in particular an undesired scattering of magnetic field lines can be reduced.

Figure 6:
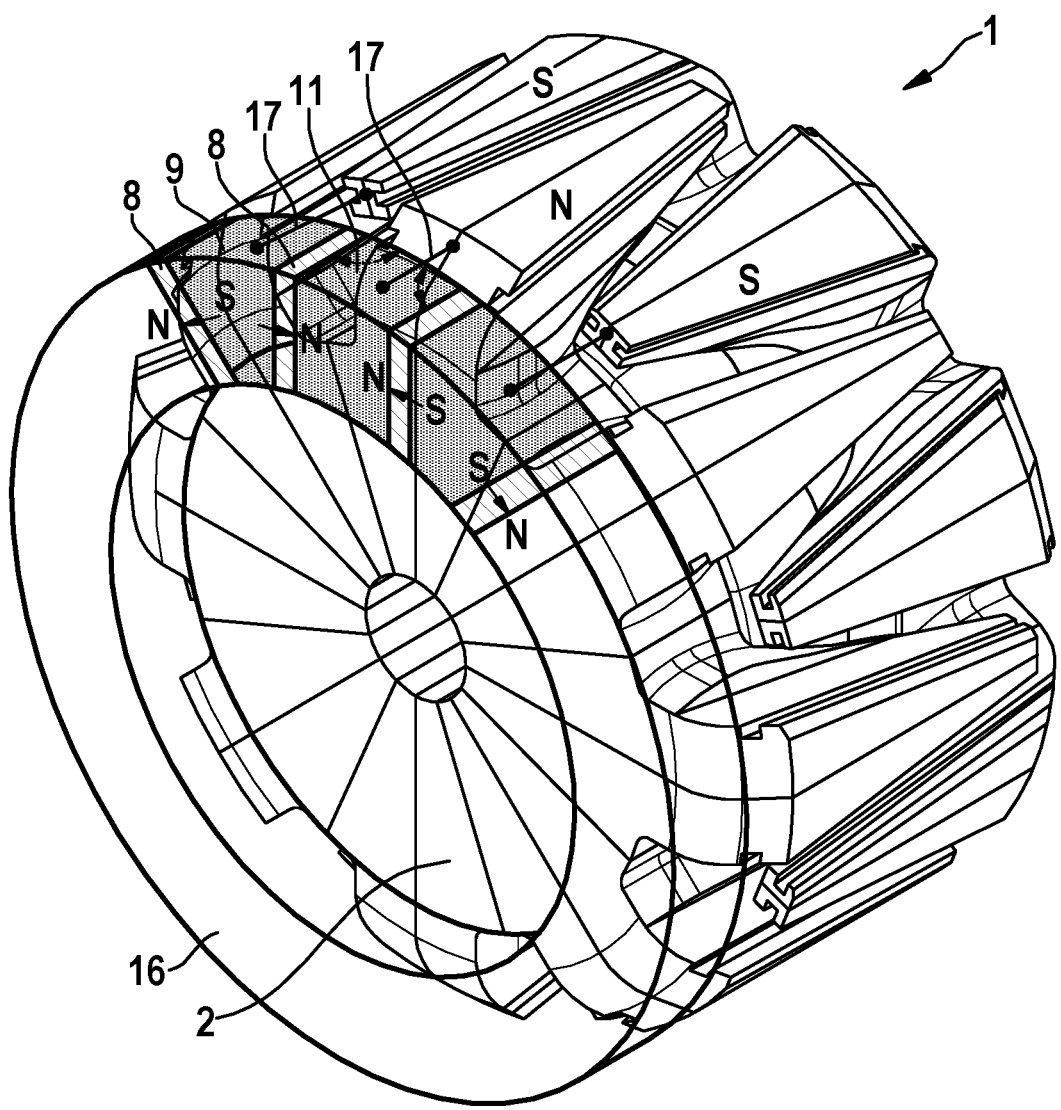
FIG. 6 shows a rotor with an additional rotor ring on the front side as carrier for the permanent magnets and the magnetic flux guiding elements.

FIG. 6 shows another example of a rotor 1 with an additional rotor ring 16 with permanent magnets 8 and magnetic flux control elements 9 and 11 arranged on one axial end face. FIG. 7 shows this rotor 1 in the claw pole machine 12 including stator 13.

The additional rotor ring 16 consists of a non-ferromagnetic material and therefore does not influence the magnetic flux. The additional rotor ring 16 accommodates the permanent magnets 8 as well as the magnetic flux guiding elements 9 and 11 and is connected to the rotor 1, in particular to the pole wheel disc 2, by connecting elements 17. It may be sufficient, as shown in FIG. 6, to arrange an additional rotor ring 16 with permanent magnets 8 and magnetic flux guiding elements 9, 11 on only one side of the rotor 1. In an alternative embodiment, however, an additional rotor ring 16 with permanent magnets 8 and magnetic flux guiding elements 9, 11 is arranged on both axial end faces of rotor 1.

The relative positioning of the permanent magnets 8 and the magnetic flux guiding elements 9 and 11 is carried out in the same way as in the previous embodiments. An additional fixation and relative arrangement of the additional rotor ring 16 to rotor 1 is achieved by the fact that the additional rotor ring 16 rests on the rotor shaft 6 of rotor 1.

The permanent magnets 8 may be cuboid in shape in all the embodiments described above, with the central plane (separating N and S) of the permanent magnets extending in the radial direction and the magnetization S—N running in the circumferential direction.

The invention claimed is:

1. Rotor of a claw pole machine (12), having a rotor winding (5), which is surrounded by pole fingers of claw poles, for generating an excitation field, and having permanent magnets (8, 10),
wherein two permanent magnets (8), which are arranged offset in the circumferential direction and have a magnetization in the circumferential direction, are allocated to a pole finger (3) in the axial direction next to the pole finger, a magnetic flux guiding element (9) being arranged between the two permanent magnets (8).

2. Rotor according to claim 1, wherein two permanent magnets (8), which are arranged offset in the circumferential direction and have a magnetization in the circumferential direction, are on at least one axial end face of the rotor (1) allocated to each pole finger (3) in the axial direction next to the pole finger, a magnetic flux guiding element (9), in particular being non-permanent magnetic, being arranged between the two permanent magnets (8).

3. Rotor according to claim 1, wherein two permanent magnets (8), which are arranged offset in the circumferential direction and have a magnetization in the circumferential direction, are on both axial end faces of the rotor (1) allocated to each pole finger (3) in the axial direction next to the pole finger, a magnetic flux guiding element (9), in particular being non-permanent magnetic, being arranged between the two permanent magnets (8).

4. Rotor according to claim 1, wherein a further magnetic flux guiding element (11) is arranged between each two permanent magnets (8) which are arranged in the axial direction next to the pole fingers and are allocated to adjacent pole fingers (3).

5. Rotor according to claim 1, wherein the permanent magnets (8) and the magnetic flux guiding elements (9, 11) are arranged on an additional rotor ring (16) which is connected in a rotationally fixed manner to the rotor (1).

6. Rotor according to claim 5, wherein the additional rotor ring (16) consists of a non-ferromagnetic material.

7. Rotor according to claim 1, wherein the permanent magnets (8) are axially neighboured in each case by a cavity (15) in a pole wheel disc (2) which is the carrier of the pole fingers (3).

8. Rotor according to claim 1, wherein the magnetic flux guiding elements (9, 11) consist of iron or contain at least iron.

9. Rotor according to claim 1, wherein a further permanent magnet (10) is arranged in the intermediate space between immediately adjacent pole fingers (3).

10. Claw pole machine with a rotor according to claim 1.
11. Claw pole machine with a rotor according to claim 2.
12. Claw pole machine with a rotor according to claim 3.
13. Claw pole machine with a rotor according to claim 4.
14. Claw pole machine with a rotor according to claim 5.
15. Claw pole machine with a rotor according to claim 6.
16. Claw pole machine with a rotor according to claim 7.
17. Claw pole machine with a rotor according to claim 8.
18. Claw pole machine with a rotor according to claim 9.

* * * * *